United States Patent Office 3,415,764
Patented Dec. 10, 1968

3,415,764
RETICULATE POLYMERIC STRUCTURE
John G. Erickson, Stillwater, Minn., assignor to Minnesota Mining and Manufacturing Company, St. Paul, Minn., a corporation of Delaware
No Drawing. Original application Apr. 6, 1964, Ser. No. 357,812. Divided and this application Sept. 22, 1965, Ser. No. 509,456
4 Claims. (Cl. 260—2.5)

ABSTRACT OF THE DISCLOSURE

A composition of matter having a reticulate structure which comprises a polymer having repeating organic sulfur groups containing carbonyl linkages. The polymer is used for resilient packing materials and in sound dampening applications.

---

This is a division of Ser. No. 357,812, filed Apr. 6, 1964.

This invention relates to valuable elastomers and particularly to elastomers having reticulate structures with low concentrations of crosslinking sites and containing multiplicities of thioether and ester linkages.

Both the ester and thioether groups are known for their effect in conferring flexibility to polymer chains. Compositions having multiplicities of these groups with favorably low, but not zero, concentrations of crosslinking sites have not so far as is known heretofore been readily available. In particular, elastomeric compositions having desirable chemical and physical properties, which can be formed into desired shapes, and which can contain solid particulate materials, are especially desirable.

It is an object of this invention to provide elastomeric compositions containing multiplicities of thioether and ester groupings.

It is a further object of this invention to provide elastomeric compositions having low but definite concentrations of crosslinking sites in reticulate structures together with multiplicities of ester and thioether linkages.

It is another object of this invention to provide cured elastomeric compositions having reticulate structures and containing multiplicities of thioether and ester linkages and containing solid particulate materials embedded therein.

It is an additional object of the invention to provide solid rocket propellants and similar self-oxidizing compositions.

Other objects of the invention will become apparent from the present disclosure.

In accordance with the above and other objects of the invention it has been found that prepolymers having one or more thioether linkages and two ester linkages in each recurring unit of the prepolymer and having identical terminal groups at each terminus of the prepolymer skeleton are readily cured by reaction with curing agents having at least two groups reactive with said terminal groups, at least a part of the total number of recurring units in the prepolymers and curing agents possessing polyvalent nodes, to produce elastomers. These at least tercopolymers are sometimes hereinafter and elsewhere referred to as cured elastomeric compositions or cured rubbers. They are characterized by having flexible chains between crosslinking sites such that the elastomers possess useful and desirable macroscopic characteristics and properties. The term polyvalent nodes is used to typify cross-linking sites establishing non-linearity of polymer chains.

The cured rubbers of the invention can be formed in sheet or block form suitable for cutting articles such as gaskets or can be produced in desired shapes or in situ as sealants.

Desirable terminal groups in the prepolymers employed include vinyl and sulfhydryl groups because either of these groups can react with a curing agent possessing the other group to produce further thioether linkages which, as noted above, enhance the desirable properties of the cured rubbers. Other desirable terminal groups include carboxyl and hydroxyl groups. The prepolymers useful in the practice of the invention comprise recurring units having the structures:

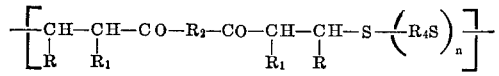

wherein R is a member of the group consisting of hydrogen, lower alkyl and phenyl radicals, $R_1$ is a member of the group consisting of hydrogen and methyl radicals, $R_2$ is a divalent residue of the group consisting of:

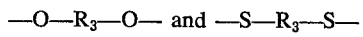

wherein $R_3$ is a divalent radical selected from the group consisting of alkylene of 2 to 8 carbon atoms, arylene of 6 to 10 carbon atoms, aralkylene of 8 to 12 carbon atoms, oxa-alkylene of 4 to 50 carbon atoms and 1 to 24 oxygen atoms and thiaalkylene of 4 to 10 carbon atoms and 1 to 4 sulfur atoms, $n$ is an integer from 0 to 1 and $R_4$ is a divalent organic radical free from oxidizing substituents and active hydrogen atoms.

Illustrative substituents where R is a lower alkyl radical are methyl, ethyl, propyl, butyl, isobutyl, tertiary butyl and the like radicals, while the $R_3$ substituents can be illustrated by alkylene radicals of 2 to 8 carbon atoms such as tetramethylene, ethylene, hexahydroparaxylylene, hexahydromethaxylylene, $\Delta^{3,4}$-hexamethylene (—$CH_2$—$CH_2$—CH CH—$CH_2$—$CH_2$—)

heptyn-3-ylene-1,6

(—$CH_2$—$CH_2$—C C—$CH_2$—$CH_2$—$CH_2$—)

and the like radicals; arylene radicals of 6 to 10 carbon atoms such as phenylene, naphthylene and the like; oxa-alkylene radicals of 4 to 50 carbon atoms and 1 to 24 oxygen atoms such as 3,6,9-tri-oxaundecamethylene

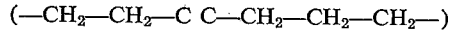

3-oxapentylene (—$CH_2$—$CH_2$—O—$CH_2$—$CH_2$—), and the like radicals; and thiaalkylene radicals of 4 to 10 carbon atoms and 1 to 4 sulfur atoms such as 3-thiapentylene

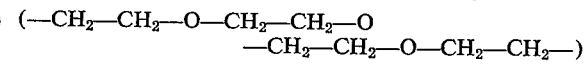

3,6-dithiaoctylene

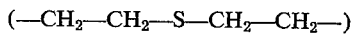
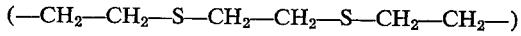

radicals, and the like.

Monomers from which these prepolymers are obtained by reaction with disulfhydryl group-containing reactants include as unsaturated components: ethylene glycol diacrylate, ethylene glycol dimethacrylate, tetramethylene glycol diacrylate, glyceryl diacrylate, 1,3 butanediol dimethacrylate, 1,4-butanediol dicrotonate, tetramethylene glycol dicinnamate, neopentylene glycol diacrylate, 1,4-trans-bis(hydroxy-methyl)-cyclohexane diacrylate, polyisobutylene glycol diacrylate, tetraethylene glycol dimethacrylate, ethane-1,2-dithiol diacrylate, butane-1,4-dithiol dimethacrylate, tetraethylene dithiol diacrylate and the like. The term acrylate-component is employed to include both acrylate and methacrylate esters as illustrated above.

The disulfhydryl group-containing reactants which are employed in forming the above prepolymers are generally represented by the formula:

$$HS(R_4S)_nH$$

wherein $n$ is a number chosen from the group consisting of zero and 1, and $R_4$ is defined as above. These disulfhydryl group-containing comonomers include:

hydrogen sulfide,
1,2-ethanedithiol,
1,4-butanedithiol,
1-methyl-butane-1,4-dithiol,
2-methyl-propane-1,3-dithiol,
2-hydroxy-propane-1,3-dithiol,
2-methoxypropane-1,3-dithiol,
2-dimethylamino-propane-1,3-dithiol,
2,2-dithiol-diethyl ether,
ethylene glycol dithioglycolate,
diethylene glycol-bis-thioglycolate,
1,2-bis-thioglycolamidoethane,
1,3-dimercaptobenzene,
toluene 3,4-dithiol,
naphthalene-1,4-dithiol,
1,4-bis(mercapto-methyl)benzene,
4-mercapto-benzylmercaptan,
3,5-dimercaptochlorobenzene,
3,5-dimercaptopyridine,
N,N'-bis-(3-mercaptopropyl)-N,N'-dimethyl phenylene-diamine,
3,3-dimercaptodipropyl sulfone,
1,7-dimercaptoheptan-4-one,
4,4-diethoxy-heptane-1,7-dithiol,
1,6-dimercapto-heptyne-3,
1,6-dimercaptoheptene-3,
3-chloro-1,6-dimercaptoheptane-3
and the like.

In addition to the above recurring or repetitive units the prepolymers comprise identical terminal groups and not more than about one crosslinking group or polyvalent node for each ten of the above recurring groups. The crosslinking units are suitably similar to the above recurring units except that one of $R_2$ and $R_4$ is a trivalent or higher valent, group having the requisite number of substituents. Thus, for example, if a prepolymer is made by reacting hydrogen sulfide and tetraethylene glycol dimethacrylate a number of crosslinking sites may be provided in the prepolymer by including a small amount of glyceryl triacrylate, trimethylolpropane triacrylate, trimethylolethane triacrylate or other triacrylate or trimethacrylate in the polymerization reaction. It will be seen that these copolymers possess polyvalent organic nuclei and three acrylyl groups which in their radical form, i.e.

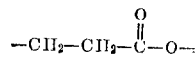

are adapted to forming chemical junctions to a terminal sulfur atom in the above structure. Likewise polyvalent organic nuclei substituted by groups possessing terminal sulfur atoms are adapted to forming chemical junctions with recurring units having terminal hydrocarbon groups. This concept will be readily understood by those skilled in the art without the complexity of general formulae showing such cross-linking sites or polyvalent nodes in greater detail.

It is generally as convenient to provide all the cross-linking sites for the cured elastomeric compositions of the invention in the curing agent and to employ prepolymers consisting of the above recurring units and desired terminal groups. These prepolymers are prepared as exemplified in the following equations by the reaction of ethylene glycol diacrylate and hydrogen sulfide to produce prepolymers having terminal groups of the class of vinyl and sulfhydryl groups. Thus, when hydrogen sulfide is employed in slight excess, the resulting prepolymer is terminated by sulfhydryl groups:

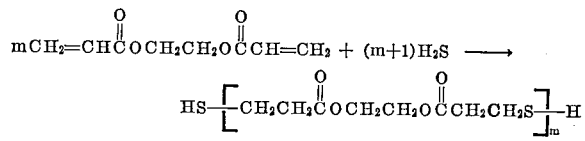

When the diacrylate is in slight excess the resulting prepolymer is terminated by vinyl groups, which are substituted when homologues of the acrylate are employed:

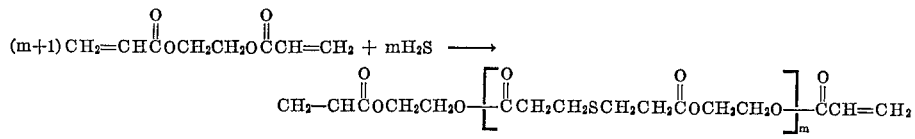

By analogous reactions other prepolymers derived from acrylates and methacrylates and hydrogen sulfide and dimercaptans are obtained. The reaction is best carried out in the presence of a tertiary amine, no weaker than pyridine, such as triethylamine, or of a sterically hindered secondary amine such as diisopropylamine and such a catalyst is necessary for reactions employing hydrogen sulfide.

It will be seen that this process produces polyesters which can be considered in a formal sense as polymers in which methylene groupings are replaced by sulfur. Following established chemical nomenclature, these polyesters are termed "thiapolyesters." The prepolymers obtained by addition of dimercaptans to diunsaturated esters, are analogously termed "dithiapolyesters."

Unbranched polythia-polyesters result when diunsaturated compounds react with disulfhydryl compounds. Branched, soluble prepolymers are produced when a small proportion of compound containing more than two acrylate or methacrylate groups or more than two sulfhydryl groups is employed together with the difunctional compound. Branching of the prepolymer can also be obtained by allowing sulfhydryl-terminated prepolymers to react with a small proportion of compound containing three or more acrylate or methacrylate groups or by allowing vinyl-terminated prepolymers to react with a small proportion of a compound containing three or more sulfhydryl groups. In any case, the cured elastomeric compositions of the invention are obtained from prepolymers which, whether branched or unbranched, are soluble in non-degrading solvents and are viable, i.e., adapted to employment in curing reactions. Usually, the useful prepolymers are viscous liquids, but, depending upon the nature of groups $R_1$, $R_2$, $R_3$, they may also be low-melting semi-solids.

The above equations illustrate the preparation of prepolymers having terminal sulfhydryl and vinyl groups. Other types of terminal groups are also useful for the preparation of elastomers of this invention. Prepolymers having these other types of terminal groups are conveniently obtained from vinyl- or sulfhydryl-terminated prepolymers by reaction with suitable polyfunctional compounds. Thus, the reaction of a vinyl-terminated thiapolyester with thioglycolic acid produces a carboxyl-terminated prepolymer and the reaction with mercaptoethanol produces a hydroxyl-terminated prepolymer. In like manner, sulfhydryl-terminated thiapolyesters react with acrylic acid or methacrylic acid to produce carboxyl-terminated prepolymers. Reactants providing other desired terminal groups will be readily apparent to those skilled in the art.

The reactions producing branching, i.e. polyvalent nodes, as well as those converting sulfhydryl or vinyl termination to other types of termination are conveniently carried out in the same reaction vessels as are used initially for the production of the simple unbranched thiapolyesters without isolation of the intermediate prepolymers as is illustrated hereinbelow.

The cured elastomeric compositions of the invention are obtained by reacting the selected prepolymer with compounds having effective functionalities of three or greater when the prepolymer is unbranched and effective functionalities of two or greater when the prepolymer is branched, i.e., has three or more terminal sulfhydryl, vinyl, or other groups. In the elastomers of the invention the crosslinking groups introduced by the curing agent and/or inherent in branched prepolymers are present only in very low concentration, usually only up to about one crosslinking site or polyvalent node for every ten diester monomer units. The nature of the crosslinking groups therefore has little effect upon such physical properties of the elastomer as flexibility, glass-temperature, or extensibility, which are determined by the length and chemical structure of the polymer chains between crosslinkages. The crosslinking sites will be seen to be nodes in the reticulate structure of the compositions of the invention.

In referring to reticulate structures herein it will be readily understood that individual reticula are finite in size and that a plurality of such reticula will normally be present in any amount of the elastomeric composition. In general, there will be from about 8 to about 75 recurring linear units between crosslinking sites but such chains need not terminate in crosslinking sites at each end in all cases. It is preferred that the number of such loose ends be minimal and no more than about one for every twenty crosslinking sites. In any case the number of free ends is not more than one for each crosslinking site.

The crosslinking or curing agent is selected particularly for completeness of reaction with the particular terminal groups to minimize the number of residual unreacted termini of the prepolymer chains which tend to reduce the tensile strength. Selection of the crosslinking agent is further guided so that the density of crosslinkages in the cured rubber is not so high as to effect significant diminution in flexibility and elongation. It will be apparent that the selection of the curing agent will be governed particularly by the chemical nature of the terminal groups of the prepolymer. Herebelow are exemplified curing agents suitable for use with prepolymers having particular terminal groups. It will be understood that suitable curing agents include materials specifically mentioned below but are not limited thereto.

Examples of compounds which cure sulfhydryl-terminated prepolymers to provide cured rubbers of the invention are illustrated in Table 1, curing agents for vinyl-terminated prepolymers are shown in Table 2, and curing agents for carboxyl and hydroxyl group-terminated prepolymers in Table 3.

TABLE 1.—REPRESENTATIVE CURING AGENTS FOR SULFHYDRYL-TERMINATED PREPOLYMERS

| For Unbranched Prepolymer | For Branched Prepolymer |
|---|---|
| Glyceryl triacrylate.a | Toluylene diisocyanate. |
| Pentaerythritol triacrylate.a | Methylene bis(4-cyclohexyl isocyanate). |
| Triacrylyl-hexahydro-s-triazine.a | Tetramethylene diacrylate.a |
| Triacrylate of trimethylolpropane.a | Carbon black.a |
| 2,4,6-tris(glycidyloxy)-s-triazine. | N,N,N',N',N'',N''-tri-1,2-butylenetrimesamide.a |
| Epoxidized polybutadiene. | Phenyl bis[1-(2-methyl)-aziridinyl]phosphine oxide. |
| Trimethacrylate of trimethylolpropane.a | |
| N,N,N',N',N'',N''-tri-1,2-propylene phosphoramide. | Triacrylyl-hexahydro-s-triazine.a |
| Carbon black.a | Ethylene dimethacrylate.a |
| Epoxy resins. | p-Quinone dioxime.a |
| Polymethylene polyphenyl-isocyanate. | Butadiene dioxide. |
| | Diglycidyl ether. |
| | Epoxy resins. |
| | Polymethylene polyphenyl-isocyanate. |
| | Zinc peroxide. | a Curing reaction normally requires a basic catalyst.

TABLE 2.—REPRESENTATIVE CURING AGENTS FOR VINYL-TERMINATED PREPOLYMERS

| For Unbranched Prepolymers | For Branched Prepolymers |
|---|---|
| Pentaerythritol tetrathioglycolate.a | Pentaerythritol tetrathioglycolate.a |
| Trithioglycolate of trimethylolpropane.a | Dithioglycolate of ethylene glycol.a |
| Tetramethylenediamine. | 1,4-butanedithiol.a |
| Diethylenetriamine. | Piperazine. |
| p-Xylylenediamine. | Styrene.b |
| Styrene.b | Acrylate and methacrylate esters.b |
| Acrylate and methacrylate esters.b | N,N'-dimethyl ethylenediamine. |
| | 4,4'-dipiperidyl. |

TABLE 3.—REPRESENTATIVE COMPOUNDS FOR CURING PREPOLYMERS WITH TERMINATIONS OTHER THAN SULFHYDRYL AND VINYL

| For Unbranched Prepolymer | For Branched Prepolymer |
|---|---|
| Epoxy resins.a | Epoxy resins.a |
| 2,4,6-tris(glycidyloxy)-s-triazine. | Epoxidized polybutadiene. |
| | Butadiene dioxide. |
| N,N,N',N',N'',N''-triethylene melamine.a | Diglycidyl ether. |
| N,N,N',N',N'',N''-tri(1,2-butylene)trimesamide.a | N,N,N',N',N'',N''-tri(1,2-butylene)-trimesamide.a |
| Epoxidized polybutadiene. | N,N,N',N'-diethylene isosebacamide.a |
| N,N,N',N',N'',N''-tri-1,2-propylenephosphoramide.a | Polymethylene polyphenyl isocyanate.b |
| Hexakis[1-(2-methyl)-aziridinyl] phosphonitrile trimer.a | Methylene bis(4-cyclohexyl isocyanate). |
| Polymethylene polyphenyl isocyanate.b | Diphenylmethane diisocyanate.b |
| | Pyromellitic dianhydride.b | a Particularly for carboxyl-terminated prepolymers.
b Particularly for hydroxyl-terminated prepolymers.

The linkages established by the various curing reactions are in many instances of the same types as are noted as desirable features of the prepolymers, namely ester and thioether linkages, and include additionally disulfide linkages (e.g., from zinc peroxide in Table 1), ether linkages (e.g. from epoxy resins with hydroxyl terminated prepolymers), carbon to carbon linkages (vinyl polymerization in Table 2), amine, amide, urethane and thiourethane linkages (various amines, isocyanates and aziridides in Tables 1, 2 and 3).

Those skilled in the art will readily recognize from the disclosure herein that the curing of sulfhydryl-terminated prepolymers with unsaturated esters of polyhydroxy compounds or with triacrylyl-hexahydro-s-triazine involves the addition of sulfhydryl groups to activate double bonds as in the formation of the prepolymers.

Curing with carbon black depends upon a similar reaction. The surface of carbon black is known to contain partial quinonoid rings, in which double bonds are activated by conjugation with carbonyl groups and hence can react with sulfhydryl groups. Carbon black, which may be considered a heterogeneous curing agent, serves not only as the curing agent but also as a filler. Curing is, of course, restricted to the surface of solid particles and the stoichiometry is therefore related to the particle size and hence specific area of the particular carbon black.

The use of dithiols or polythiols as well as amines for curing vinyl-terminated prepolymers is based upon the same type of reaction, i.e., addition to activated double bonds. Disecondary amines cure branched vinyl-terminated prepolymers and diprimary amines, which have greater functionality, cure unbranched prepolymers; in either case the amine groups add across activated double bonds as the sulfhydryl groups do. Polyisocyanates react with SH and OH groups with the formation of thiourethane groups

and urethane groups, respectively. Polyaziridides undergo ring opening with formation of

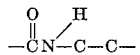

groups. Oxirane rings also open to produce ether or ester linkages.

The use of unsaturated monomers such as styrene and acrylate esters as curing agents depends upon copolymerization, by the well-known free radical vinyl polymerization mechanism, of small amounts of these monomers with terminal vinyl groups of the prepolymers.

Curing agents employed with prepolymers having other types of termination than sulfhydryl or vinyl groups are likewise selected according to the nature of the termination. With carboxyl-terminated prepolymers, for example, three-membered heterocyclic ring compounds such as oxirane- or aziridine-containing compounds are useful, e.g. epoxy resins or poly-aziridide and with hydroxyl-terminated prepolymers di- or poly-isocyanates produce valuable cured elastomers of the invention.

It will be seen that the cured rubbers of the invention comprise recurring units as set forth above together with poly-valent nodes or crosslinking sites, consisting essentially of organic nuclei with associated bridging groups, and connective groups selected from the group consisting of ether, thioether, ester, amide, amine, urethane, thiourethane, disulfide and carbon-to-carbon linkages connecting the polyvalent crosslinking sites to the recurring units through the residues of the identical terminal groups of the prepolymers.

The amount of curing agent employed is selected on the basis of the stoichiometry of the desired reaction, i.e., reaction of one functional group of the curing agent with each terminal group of the prepolymer, making due allowance for any side reactions which may consume part of the curing agent.

In all cases the curing agent and any catalyst required for the curing reaction are mixed thoroughly with the prepolymer. When fillers, which term includes solid particulate material of whatever nature such as oxidants, leachable solids or materials providing bulk, are used, these materials are also mixed with the prepolymer. Curing is then effected, under pressure if desired, at a temperature in the range of from 50° C. to 250° C. The exact temperature will be determined by the particular curing agent employed and other factors which will be readily apparent to those skilled in the art. The preferred range of temperature is from about 25° C. to about 200° C.

Normal prudence will dictate the exercise of suitable precautions when cured rubbers of the invention are filled with solid oxidizers such as ammonium perchlorate or ammonium nitrate in preparing propellant grains because mixtures incorporating such oxidants are explosive, especially when subjected to the mechanical stresses of mixing. Suitable precautions include conducting the operations of mixing, curing, and handling remotely and/or behind substantial barricades.

The products of the invention have utility in a variety of fields where elastomers are used. Unfilled compositions have properties more like gum-stock whereas compositions comprising bulky fillers more closely resemble filled rubbers. Some compositions of the invention show good resistance to swelling by hydrocarbon liquids and are therefore useful in fuel lines, gaskets, sealants and adhesives where subjected to such environments. Particularly useful are those which, with the proper degree of curing, are both elastomeric and adhere well to metal. These can be cured between parts made, for example, of aluminum and serve as sealers. Compositions of the invention filled with high contents of oxidants, such as ammonium nitrate, ammonium perchlorate, or ammonium percholate together with aluminum powder, are useful for solid rocket propellants and pyrotechnics.

Elastomeric sponges are obtained from the filled compositions of this invention when a leachable filler is employed in amount sufficient to permit of leaching, for example, so that particles are largely contiguous. These spongy structures of the invention are useful as resilient packing materials, in sound-dampening applications, and the like. When the recurring units comprise highly hydrophilic groups, e.g., polyalkylene oxides, and the like, these structures have outstandingly soft hand and are particularly useful as bath sponges, in toilet articles and in surgical dressings and the like. Pores of predetermined size (which may be regularly polyhedral in shape) are readily obtained by use of a filler having a suitable particle size. Thus, employing sodium chloride as filler, it is readily possible to obtain structures having cubical pores. Spherical pores entail the minimum volume of pore space for a given weight of connective binder and hence sponges having cubical pores have greater free space.

Having thus described the invention broadly, it is more particularly described by means of examples showing the best mode presently contemplated of practicing the invention. In these examples parts are by weight where not otherwise indicated and inherent viscosities are determined by conventional procedures employing the solvents specified.

EXAMPLE 1

This example illustrates the preparation of sulfhydryl-terminated thiapolyesters and of cured, filled compositions of the invention obtained therefrom. A solution of 330 parts of the dimethacrylate of tetraethylene glycol and 20 parts of diisopropylamine in 400 parts of pyridine is saturated periodically with hydrogen sulfide, the uptake being determined by weighing. During two days 27 parts of hydrogen sulfide are reacted. The reaction mixture is permitted to stand for three days and again thoroughly saturated with hydrogen sulfide for two hours. After standing for five hours, the highly odorous solution is filtered to remove a yellow crystalline precipitate and is precipitated in heptane. The sulfhydryl-terminated yellow tacky polymer is dissolved in methylene chloride, reprecipitated and washed with heptane and dried. It then has an inherent viscosity in chloroform of 0.142 and in methylene chloride of 0.124. Analysis shows the presence of 1.6 percent of sulfhydryl groups which corresponds to a number average molecular weight of about 5800 in agreement with the value calculated from the inherent viscosity. This thiapolyester is designated as lot A.

The above procedure is repeated using 15 parts of diisopropylamine as catalyst and adding hydrogen sulfide a little more slowly, so that over 27 parts is absorbed during a total of three weeks. The reaction mixture is then thoroughly saturated with hydrogen sulfide for about 1.5 hours and precipitated and otherwise worked up as above. The viscous yellow sulfhydryl-terminated monothiapolyester has an inherent viscosity in methylene chloride of 0.152. It contains 0.5 percent of water and 0.9 percent of sulfhydryl groups which latter corresponds to a molecular weight of about 7400 in agreement with the value computed from the inherent viscosity of this polymer. This thiapolyester is designated lot B.

The following procedure illustrates a crosslinking and curing procedure requiring neither heat nor pressure, and giving a rubbery material.

A mixture of 4.15 parts of monothiapolyester lot A, 0.143 part of trimethylolpropane triacrylate and 1.72 parts of carbon black (Philblack O) is milled together and about 0.1 part of diisopropylamine is milled in. The mixture is molded and cured to form rubber test samples at 25° C. without application of pressure. In 8 days it has cured to a tough tack-free rubber having a hardness (Shore Durometer Scale $A_2$) of 65. Testing in an Instron tester shows an elongation of 260 percent at break with tensile strength of 1860 p.s.i. and no set.

A series of cured rubbers is prepared using the thiapolyesters of lot A and of lot B above with various proportions of carbon black, the above trimethylolpropane triacrylate as curing agent, and 2,4,6-tris(dimethylaminomethyl)phenol together with diisopropylamine as the catalyst. These samples are cured for 56 hours at 25° C. followed by 5 hours at 60° C. Test specimens are then cut and tested by standard procedures for measuring the properties of elastomers. The proportions used and results of the tests are shown in Table 4 in which parts are by weight and the method of mixing is that described above.

24 hours and the dry weight determined. The result is then expressed:

$$\text{Percent swell} = 100 \left(\frac{\text{sp. gr. polymer}}{\text{sp. gr. solvent}}\right) \times \left(\frac{\text{swollen weight}}{\text{dry weight}}\right) - 1$$

Table 5 shows such values for the above four cured rubbers.

TABLE 5

| Run | 1 | 2 | 3 | 4 |
|---|---|---|---|---|
| Percent swell | 1,990 | 1,012 | 638 | 665 |
| Percent gel | 69 | 91 | 96 | 91 |

Percent gel is a measure of the extent to which crosslinking has been effected in curing, and is determined by the standard method.

EXAMPLE 2

This example further illustrates the preparation of a sulfhydryl-terminated thiapolyester and of filled, cured compositions of the invention obtained from it by reaction with a triacrylate. Compositions prepared as described in this example are suitable for use in fuel lines handling petroleum hydrocarbons.

A solution of 68 parts of the dimethacrylate of tetraethylene glycol and 10 parts of diisopropylamine in 150 parts of pyridine is saturated with hydrogen sulfide, more being added from time to time as needed, and the total uptake is determined. A total of 7.1 g. of hydrogen sulfide is added in eight days. The polymer is then precipitated in heptane, washed therewith and dried. The inherent viscosity in chloroform is 0.335 and the sulfhydryl content 0.3% by weight. This sulfhydryl-terminated thiapolyester cures to rubbers of the invention having properties which are dependent on the amount and nature of the curing agent employed. In each case of

TABLE 4

| Run | 1 | 2 | 3 | 4 |
|---|---|---|---|---|
| Thiapolyester lot A | | 100 | 100 | 100 |
| Thiapolyester lot B | 100 | | | |
| Carbon black | 20 | 20 | 40 | 40 |
| Diisopropylamine | 2.5 | 2.5 | 2.5 | |
| Trimethylol propane triacrylate | 3.45 | 3.45 | 3.45 | 3.45 |
| 2,4,6-tris(dimethylaminomethyl)-phenol | | | | 2.45 |
| Tensile Properties (ASTM-D412-51T): | | | | |
| F100 (p.s.i.) | 40 | 170 | 430 | 200 |
| F break (p.s.i.) | 250 | 430 | 1,025 | 830 |
| Elongation (percent) | 465 | 220 | 200 | 430 |
| Set (percent) | 0 | 0 | 0 | 3.1 |
| Low Temperature Properties (° C.) (ASTM-D746-55T and ASTM-D1054-54T): | | | | |
| $T_g$ | −16 | −30.5 | −38 | −34 |
| $T_{10}$ | −26 | −36.5 | −42.5 | −46 |
| $T_{100}$ | −41.5 | −44 | −46.5 | −46 |
| $T_B$ | −39 − −41 | −45 − −48 | −41 − −43 | −41 − −43 |
| Swelling in solvents (percent) (48 hrs.) at 25° C.: | | | | |
| Benzene | 565 | 357 | 230 | 265 |
| Acetone | 322 | 172 | 130 | 162 |
| Carbon tetrachloride | 198 | 140 | 104 | 109 |
| Ethyl acetate | 392 | 224 | 156 | 174 |
| 70:30 isooctane-toluene | 23 | 19 | 19 | 13 |
| Water | 13 | 6 | 6 | 6 |
| Swelling in solvents (percent) (2 weeks) at 25° C.: | | | | |
| Benzene | 590 | 390 | 240 | 265 |
| Acetone | 360 | 255 | 140 | 165 |
| Carbon tetrachloride | 200 | 150 | 110 | 120 |
| Ethyl acetate | 445 | 225 | 150 | 175 |
| 70:30 isooctane-toluene | 33 | 19 | 19 | 19 |
| Water | 26 | 12 | 6 | 12 |

The rubber of Run 1 shows a generally less "tight" cure than do the other three and air aging characteristics at elevated temperatures also indicate this, since there is a tendency to be somewhat tacky, whereas the other three are all satisfactory in this respect. This is further shown by the swell and gel test.

A weighed sample of each rubber in a fine mesh monel mttal wire cake is stirred with methylene chloride for 72 hours and superficially dried, and the weight of swollen gel determined. It is then dried in vacuo at 65° C. for the following group of cured polymers the triacrylate of trimethylolpropane is employed as curing agent. It is mixed with the thiapolyester, diisopropylamine is added as a catalyst and the mixture allowed to stand at ordinary temperature for at least one week. It may be desirable to take precautions to prevent loss of this volatile catalyst when curing is effected at elevated temperatures. The proportions employed (in parts by weight) and observation on the product rubbers are summarized in Table 6. The filler employed is carbon black.

TABLE 6

| Monothiapolyester | Curing agent | Catalyst | Filler | Character of product |
|---|---|---|---|---|
| 2.88 | .024 | .02 | | Slightly tacky extensible rubber. |
| 2.40 | .016 | .02 | | Do. |
| 3.84 | .032 | .05 | 1.55 | Non-tacky extensible rubber. |
| 0.96 | .008 | | | Tacky adhesive adhering to aluminum removed with cohesive failure. |

The last is useful in adhesive compositions, the former can be cut to desired shapes to make bottle closures or crown sealers.

EXAMPLE 3

This example illustrates the preparation of an unbranched thiapolyester, the conversion thereof to branched thiapolyesters and the preparation of cured rubbers of the invention therefrom employing several curing agents.

A sulfhydryl-terminated thiapolyester having an inherent viscosity of 0.11 in chloroform and containing 2.2% by weight of sulfhydryl groups is prepared by the general procedure of Examples 1 and 2 above.

A branched thiapolyester, designated lot X, is prepared from a mixture of 100 parts of this thiapolyester, 1.87 parts of triacrylylhexahydro-s-triazine, 2 parts of diisopropylamine, and 120 parts of pyridine which is allowed to stand at room temperature for 18 hours and is then precipitated in heptane. The precipitated liquid polymer is washed repeatedly with heptane and dried. This branched, sulfhydryl-terminated thiapolyester, designated as lot X, has an inherent viscosity of 0.186 in chloroform and contains 1.3% by weight of sulfhydryl groups.

Another branched thiapolyester, designated lot Y, is prepared similarly employing 125 parts of the unbranched thiapolyester, 2.6 parts of triacrylylhexahydro-s-triazine, 3 parts of diisopropylamine and 200 parts of pyridine. Reaction is permitted to proceed for 120 hours and the product is then worked up as for lot X. The branched, sulfhydryl-terminated lot Y contains 1.1% by weight of sulfhydryl groups.

These selectively branched thiapolyesters provide cured rubbers of the invention. Thus, lot X is cured to a tack-free rubbery material in 4 days at room temperature by reaction of 100 parts thereof with 1 part of tris(dimethylaminomethyl)phenol and 6 parts of zinc peroxide. It is cured to a tack-free rubber in 4 hours at 60° C. when 100 parts are mixed with 10 parts of tris(dimethylaminomethyl)phenol and 50 parts of a liquid epoxy resin polymer (Epon 828) derived from Bisphenol A. Excellent rubbery properties are obtained from systems of this thiapolymer containing carbon black when cured with di- or tri-unsaturated compounds as illustrated in Table 7, in which the number of parts of each ingredient is given.

the use of pressure being required at the higher temperatures. The amount of carbon black employed as a filler can be varied but from about 30 to 40 percent of the weight of prepolymer seems especially suitable as shown by the properties of the rubbers thus filled, which are set out in the following table. The rubber samples are prepared from 100 parts of thiapolymer lot Y, using 75 percent of the computed stoichiometric amount of tetramethylene diacrylate (2.05 parts) as curring agent and 2 parts of diisopropylamine as the catalyst, and curing by heating at 250° F. under moderate pressure for 1 hour.

TABLE 8

| Run | 1 | 2 | 3 |
|---|---|---|---|
| Carbon black (percent of thiapolymer lot Y) | 30 | 35 | 40 |
| Appearance | Good | Good | Good |
| Shrinkage in mold | None | None | None |
| Tensile strength at break (p.s.i.) | 570 | 1,110 | 1,060 |
| Elongation (percent) | 550 | 600 | 600 |
| Set at break | 12.5 | 10.8 | 37.5 |

EXAMPLE 4

This example further illustrates curred, filled compositions of the invention.

A sulfhydryl-terminated thiapolyester is prepared by the procedure described in Example 1 for lot A. The product is found to have an inherent viscosity of 0.11 in chloroform and to contain 2.1% by weight of sulfhydryl groups.

A mixture of 9 parts of this thiapolyester, 1 part of N,N,N',N',N'',N'', - tris(1,2-butylene)-trimesamide, 0.2 part of 2,4,6 - tris(dimethylaminomethyl)phenol, and 23 parts of powered sodium chloride is allowed to stand at ambient temperature for 24 hours. The product is a firm, elastic, filled composition. The same result may be achieved by heating for two hours at 200° F. A spongy elastomer is obtained by leaching this composition with water. It is useful as a bath sponge.

A mixture of 4 parts of the above thiapolyester, 4 parts of ammonium perchlorate, and 0.75 part of epoxy resin (Epon 828) is cured at 140° C. The product is a flexible, elastic composition which burns readily when ignited and is suitable for use as a flare.

EXAMPLE 5

This example illustrates the formation of a cured rubber of the invention in which curing of a branched thiapolyester is effected with carbon black as the reactive cross-linking agent.

A sulfhydryl-terminated liquid thiapolyester having inherent viscosity in chloroform of 0.10 and containing 2.2% by weight of sulfhydryl groups is prepared by the addition of hydrogen sulfide to the dimethacrylate of tetraethylene glycol, following the procedure of the above examples.

A homogeneous mixture of 1300 parts of this thia-

TABLE 7

| Run | 1 | 2 | 3 | 4 | 5 | 6 | 7 |
|---|---|---|---|---|---|---|---|
| Lot X (parts) | 100 | 100 | 100 | 100 | 100 | 100 | 100 |
| Carbon black | | 20 | 40 | | 40 | | 40 |
| p-Quinone dioxime | 7 | 7 | 7 | | | | |
| Tetramethylene diacrylate | | | | 4 | | | |
| Trimethylolpropane triacrylate | | | | | | 4 | 4 |
| Diphenyl guanidine | 0.7 | 0.7 | 0.7 | | | | |
| Diisopropylamine | | | | ca. 2 | ca. 2 | ca. 2 | ca. 2 |
| Cure time (hours) | 16 | 16 | 16 | 120 | 120 | 120 | 120 |
| Cure temp. (° F.) | 250 | 250 | 250 | ca. 70 | ca. 70 | ca. 70 | ca. 70 |
| Tensile strength (p.s.i.) | 60 | 220 | 515 | 67 | 1,175 | 72 | 1,225 |
| Elongation (percent) | 450 | 400 | 270 | 400 | 600 | 20 | 160 |

It is apparent that the degree of branching can be adjusted to give desirable tensile strength and elongation by choice of proportions and nature of the branching agents and curing agents. It appears that carbon black is a particularly useful filler and diisopropylamine is a suitable catalyst for the curing. Triethylamine is also a satisfactory catalyst. Temperatures ranging from ambient temperature up to about 250° F. are useful; shorter times and polyester, 1600 parts of pyridine, 38 parts of trimethylolethane triacrylate, and 20 parts of diisopropylamine is allowed to stand for 23 hours at room temperature. The polymer is then precipitated by pouring the mixture into heptane. The product is washed several times with heptane, dissolved in methylene chloride, reprecipitated with heptane, washed further with heptane, and dried. The branched thiapolyester is obtained as a viscous yellow liquid having an inherent viscosity in chloroform of 0.21 and containing 1.2% by weight of sulfhydryl groups.

A mixture of 5 parts of the branched thiapolyester, 2 parts of carbon black (Philblack O, fine), and 0.2 part of diisopropylamine is allowed to stand in a mold at room temperature. After several days the mixture has cured to a rubbery sheet suitable for cutting a gasket.

EXAMPLE 6

This example illustrates the preparation of a diacrylate of a dithiol, its conversion to a sulfyhydryl-terminated thiapolyester and a cured composition of the invention obtained from this prepolymer by reaction with an epoxy resin.

A solution of 27.9 parts of β-chloropropionyl chloride in 24 parts of benzene is added gradually to a solution of 22.2 parts of triethylamine and 12.2 parts of butanedithiol in 400 parts of benzene held at about 25° to 30° C. and the reaction mixture is then allowed to stand at ambient temperatures for about 4 days. Triethylamine hydrochloride is removed by filtration and the filtrate is washed repeatedly with water and aqueous sodium bicarbonate solution, dried and evaporated to give brownish oily residue of 1,4-butanedithiol bis-β-chloropropionate.

The oily bis-chloroproprionate is taken up in about 50 parts of benzene and 14 parts of tetramethyl guanidine are added at 25° C. to effect dehydrohalogenation. After stirring for 10 minutes, about 100 parts of heptane are added and the solution is washed with water until substantially neutral. The organic layer is filtered to remove suspended material, dried and evaporated under reduced pressure at 25° C. to recover the product. The diacrylate of 1,4-butanedithiol is obtained as a light yellowish oil having a faint odor. It is not distilled since it homopolymerizes readily on heating.

A solution of 8 parts of the above butanedithiol diacrylate

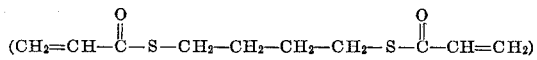

and 1 part of diisopropylamine in 100 parts of pyridine is exposed repeatedly to gaseous hydrogen sulfide at 25° C. After about 24 hours there is no further absorption of hydrogen sulfide and the solution is precipitated in about 500 parts of heptane and the oily prepolymer is washed with further portions of heptane. The thiapolyester is obtained as a yellowish-brown liquid having an inherent viscosity in chloroform of 0.10 corresponding to an approximate molecular weight of 3500. It is a sulfhydryl-terminated prepolymer.

A mixture of 6 parts of the above thiapolyester and 1 part of epoxy resin (available commercially under the designation Epon 828) is heated at 140° C. for several hours. The product is a rubbery cured elastomeric composition of the invention suitable for use in gaskets.

EXAMPLE 7

Herein is illustrated the preparation of a sulfhydryl-terminated thiapolyester by addition of a dimercaptan to a diacrylate and a cured elastomeric composition of the invention obtained by curing the thiapolyester prepolymer with a polyisocyanate.

A mixture of 25.5 parts of ethylene diacrylate, 40.6 parts of the dithioglycolate of diethylene glycol, 50 parts of pyridine, and 3 parts of diisopropylamine is allowed to stand for one week. The polymer is then precipitated in heptane, washed with heptane, and dried. It is a sulfhydryl-terminated dithiapolyester.

A mixture of 10 parts of this dithiapolyester and 0.4 part of polymethylenepolyphenyl isocyanate is allowed to stand at 25° C. for 24 hours. A cured, elastic composition is formed. This rubber is suitable for sealing gaskets.

EXAMPLE 8

This example illustrates the preparation of a diacrylate of a thiodialcohol, conversion of this diacrylate to a sulfhydryl-terminated dithiapolyester by reaction with hydrogen sulfide, and a cured composition obtained by reaction of the prepolymer with a triunsaturated ester.

The diacrylate of thiodiglycol

is prepared by reaction of acrylyl chloride with thiodiglycol in the presence of excess triethylamine as hydrogen chloride acceptor.

A solution of 23 parts of this diacrylate, 2 parts of diisopropylamine and 100 parts of tertiary butyl alcohol is stirred and saturated with hydrogen sulfide each day for about 8 days. The odor of hydrogen sulfide is found to persist throughout this time. The reaction mixture is then poured into about 500 parts of heptane, and the sulfhydryl-terminated polymer which precipitates is washed and dried.

This prepolymer is converted to a cured elastomeric composition of the invention having good flexibility and extensibility by reaction with the triacrylate of trimethylolpropane.

EXAMPLE 9

The formation of vinyl-terminated thiapolyesters useful for curing to elastomers of the invention requires a slight deficit, generally of less than about 5 mole percent, in the amount of hydrogen sulfide used in the above reactions. This may be accomplished by permitting the heteropolymerization to proceed past the point where the odor of hydrogen sulfide is no longer evident and then adding a further amount of the unsaturated component, but it is preferable to employ a definite amount of hydrogen sulfide which is less than necessary to provide equimolar amounts with the diunsaturated compound. This latter procedure is illustrated by the following preparation:

A solution of 198 parts of the dimethacrylate of tetraethylene glycol and 15 parts of diisopropylamine in 350 parts of pyridine is repeatedly exposed to hydrogen sulfide during about three days and is then permitted to stand for about 1 day; the total amount absorbed is 16.0 parts, as compared to 20.4 parts theoretically absorbable, calculated on a equimolar basis. The thiapolyester is isolated as before by precipitation and washing with heptane and then is further purified by dissolving in methylene chloride followed by precipitation and finally drying. The resultant very pale yellow fluid product is a vinyl-terminated thiapolyester polymer and has an inherent viscosity in methylene chloride of 0.076, corresponding to a molecular weight of about 2200 to 2300.

The above vinyl-terminated thiapolyester is cured in about 1 week to tack-free, useful flexible and extensible cured rubbers of the invention by reaction of from about 13 to about 8 parts of weight of the thiapolyester with one part by weight of the tetrathioglycolate of pentaerythritol in the presence of about 0.1 part of diisopropylamine. Polymers having greater flexibility and extensibility are obtained by employing vinyl-terminated polyesters having molecular weights of 5000 to 8000 or even higher so that there is a lower density of crosslinking.

EXAMPLE 10

A vinyl-terminated thiapolyester is prepared by the procedure of Example 9 by adding hydrogen sulfide periodically over a period of several weeks to a solution of 330 parts of the dimethacrylate of tetraethylene glycol and 15 parts of diisopropylamine in 450 parts of pyridine. The polymer is precipitated in heptane, washed thoroughly, dissolved in methylene chloride and reprecipitated

15 twice in heptane. The inherent viscosity of the vinyl-terminated thiapolyester in chloroform is 0.27, indicating a molecular weight of about 13,800.

A mixture of 100 parts of this prepolymer, 10 parts of styrene, and 0.5 part of azobisisobutyronitrile is heated for one hour at 150° F. and then for two hours at 212° F. The product is a cured elastomeric combination of the invention suitable for use in gaskets.

EXAMPLE 11

This example illustrates the preparation of a carboxyl-terminated thiapolyester, its curing with a triaziridinyl compound, and the preparation of a solid rocket propellant composition by incorporation of a solid oxidizer in the cured composition.

A solution of 50 parts of the sulfhydryl-terminated thiapolyester of Example 4, 3 parts of acrylic acid, and 10 parts of triethylamine in 100 parts of pyridine is allowed to stand for several days at ambient temperature. The prepolymer is then precipitated by pouring the mixture into water. It is dried, dissolved in methylene chloride, precipitated in heptane, washed with heptane, and dried. The product is a viscous liquid and is a carboxyl-terminated thiapolyester.

A mixture of 5 parts of this carboxyl-terminated thiapolyester, 0.28 part of N,N,N′,N′,N″,N″-tri-(1,2-butylene)-trimesamide, and 15.9 parts of ammonium perchlorate is allowed to stand overnight at ambient temperature. The product is a cured combustible elastic composition of the invention suitable for use as a solid rocket propellant. The curing operation can be accelerated by heating at higher temperatures, e.g. 100° C.

EXAMPLE 12

This example illustrates another method for the preparation of a branched, carboxyl-terminated thiapolyester and for the curing of this thiapolyester with an epoxy resin and oxidant filler to provide a solid rocket propellant composition.

A solution of 198 parts of ethylene glycol dimethacrylate and 15 parts of diisopropylamine in 350 parts of pyridine is repeatedly exposed at ambient temperatures and over several days to measured amounts of hydrogen sulfide gas; 28.4 parts of hydrogen sulfide are reacted leaving about one-sixth of the original unsaturated groups free. To one-third of this reaction mixture containing vinyl-terminated thiapolyester are added 3.2 parts of pentaerythritol tetrathioglycolate, a tetrathiol compound. This quantity is sufficient to react with about one-fourth of the free vinyl groups and thus to introduce branching of the polymer chains. The reaction proceeds readily and within 1–2 hours the solution becomes much more viscous. The reaction is permitted to proceed for a total of about five days. At this point 7.6 parts of thioglycolic acid are added to the reaction mixture to introduce carboxylic terminal groups on the remaining vinyl groups. Addition proceeds rapidly and after about 18 hours the carboxyl-terminated, selectively branched thiapolyester is precipitated in heptane, washed first with heptane and then with water, and dried. The brown, viscous liquid prepolymer is carboxyl-terminated, with terminal groups having the structure:

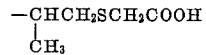

The polymer is found to contain about 0.77 milliequivalent of carboxyl groups per gram and to have an equivalent weight of about 1300.

A mixture of 5 parts of the carboxyl-terminated polyester, one part of epoxy resin (Epon 828), and 14 parts of ammonium perchlorate is prepared and cured by heating at 50° C. for several hours. The cured product is an elastic composition suitable for use as a rocket propellant. When ignited it burns evenly and rapidly.

16

EXAMPLE 13

Herein is illustrated the perparation of a vinyl-terminated thiapolyester from a diunsaturated ester and a dimercaptan, the conversion of this vinyl-terminated prepolymer to a hydroxyl-terminated prepolymer, and a filled cured elastomeric composition obtained from this hydroxyl-terminated prepolymer.

1,4-butylene dicrotonate is prepared by stirring a mixture of 27 parts of 1,4-butanediol, 240 parts of benzene, and 62 parts of triethylamine while 75 parts of crotonyl chloride is added over a period of 45 minutes. The mixture is held at 30–35° C. during the addition. The mixture is stirred for an additional 45 minutes and filtered. The filtrate is washed with water and dilute sodium bicarbonate solution until it is neutral, then distilled to yield 1,4-butylene dicrotonate, boiling at 70–71° C. under a pressure of 0.025 millimeters of mercury, and having refractive index $n_D^{25}=1.4517$.

*Analysis.*—Calculated for $C_{12}H_{18}O_4$: 63.6% C, 8.0% H. Found: 63.7% C, 8.1% H.

A mixture of 47.5 parts of 1,4-butylene dicrotonate, 18.8 parts of ethanedithiol, 150 parts of pyridine, and 5 parts of triethylamine is allowed to stand for several days at ambient temperature. To this mixture containing vinyl-terminated dithiapolyester are added 2.5 parts of mercaptoethanol. After standing for two days, the product is precipitated in waetr, washed with water, and dried. It is then dissolved in methylene chloride, precipitated in heptane, washed with heptane and dried. The resultant prepolymer is hydroxyl-terminated.

Ten parts of the above hydroxyl-terminated thiapolyester, 0.4 part of polymethylenepolyphenyl isocyanate containing 3.1 isocyanate groups per molecule by analysis, 14.4 parts of aluminum powder and 55.3 parts of ammonium perchlorate are mixed thoroughly and allowed to stand for several days. The resultant filled cured elastomeric combination is suitable as a solid rocket propellant.

Numerous other variations within the scope of the invention will readily become apparent to those skilled in the art from reaching the foregoing specification. It will be seen that curing reactions may be effected in suitable molds to produce articles of predetermined shapes when desired and that when curing is effected in bulk or sheet form, useful articles may be obtained by cutting, stamping and the like operations.

What is claimed is:

1. As a composition of matter, a cured elastomeric composition having a recticulate structure comprising nodes interconnected by divalent linear repeating units of the structure

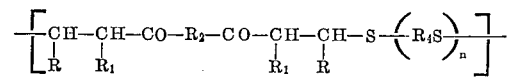

wherein R is a member of the group consisting of hydrogen, lower alkyl and phenyl radicals:

$R_1$ is a member of the group consisting of hydrogen and methyl radicals, $R_2$ is a divalent residue of the group consisting of:

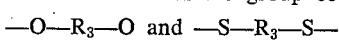

$R_3$ is a divalent radical selected from the group consisting of:
- alkylene of 2 to 8 carbon atoms,
- arylene of 6 to 10 carbon atoms,
- aralkylene of 8 to 12 carbon atoms,
- oxa-alkylene of 4 to 50 carbon atoms and 1 to 24 oxygen atoms and
- thia-alkylene of 4 to 10 carbon atoms and 1 to 4 sulfur atoms, $R_4$ is a divalent organic radical free from oxidizing substituents and active hydrogen atoms and $n$ is an integer from 0 to 1 said nodes being characterized by an organic nucleus and from three to four iterative connecting groups adapted to chemical junction with said repeating units.

2. As an article of manufacture, in combination, a discontinuous phase of solid discrete particles and a continuous phase of a cured elastomeric composition having a reticulate structure consisting essentially of nodes interconnected by divalent linear repeating units of the structure:

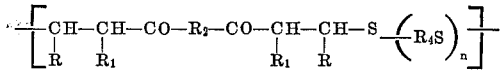

wherein R is a member of the group consisting of hydrogen, lower alkyl and phenyl radicals:

$R_1$ is a member of the group consisting of hydrogen and methyl radicals, $R_2$ is a divalent residue of the group consisting of:

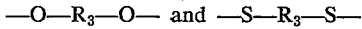

$R_3$ is a divalent radical selected from the group consisting of:
 alkylene of 2 to 8 carbon atoms,
 arylene of 6 to 10 carbon atoms,
 aralkylene of 8 to 12 carbon atoms,
 oxa-alkylene of 4 to 50 carbon atoms and 1 to 23 oxygen atoms and
 thia-alkylene of 4 to 10 carbon atoms and 1 to 4 sulfur atoms, $R_4$ is a divalent organic radical free from oxidizing substituents and active hydrogen atoms and $n$ is an integer from 0 to 1 said nodes being characterized by an organic nucleus and from three to four iterative connecting groups adapted to chemical junction with said repeating units.

3. As an article of manufacture a spongy structure consisting of a cured elastomeric composition having a reticulate structure consisting essentially of nodes interconnected by divalent linear repeating units of the structure:

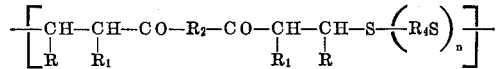

wherein R is a member of the group consisting of hydrogen, lower alkyl and phenyl radicals:

$R_1$ is a member of the group consisting of hydrogen and methyl radicals, $R_2$ is a divalent residue of the group consisting of:

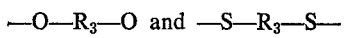

$R_3$ is a divalent radical selected from the group consisting of:
 alkylene of 2 to 8 carbon atoms,
 arylene of 6 to 10 carbon atoms,
 aralkylene of 8 to 12 carbon atoms,
 oxa-alkylene of 4 to 50 carbon atoms and 1 to 24 oxygen atoms and
 thia-alkylene of 4 to 10 carbon atoms and 1 to 4 sulfur atoms, $R_4$ is a divalent organic radical free from oxidizing substituents and active hydrogen atoms and $n$ is an integer from 0 to 1 said nodes being characterized by an organic nucleus and from three to four iterative connecting groups adapted to chemical junction with said repeating units, the interstices of said spongy structure being replicates formed by leaching of soluble solid discrete particles.

4. As a composition of matter, a rubbery composition having a reticulate structure consisting essentially of trivalent organic nodes having the structure:

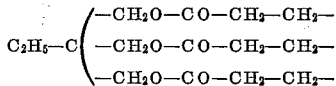

interconnected by divalent linear units having the structure:

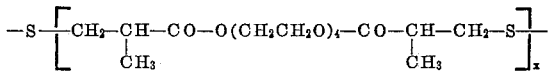

wherein $x$ is a measure of the length of said linear units and is an integral member in the range of from about 8 to about 75.

References Cited
UNITED STATES PATENTS 3,278,352  10/1966  Erickson _____ 260—79

MURRAY TILLMAN, *Primary Examiner.*

M. FOELAK, *Assistant Examiner.*

U.S. Cl. X.R.

149—19; 214—518, 508; 260—79

UNITED STATES PATENT OFFICE
CERTIFICATE OF CORRECTION

Patent No. 3,415,764                                                     December 10, 1968

John G. Erickson

It is certified that error appears in the above identified patent and that said Letters Patent are hereby corrected as shown below:

Column 6, TABLE 2, add the footnotes -- (a) Curing reaction normally requires a basic catalyst. (b) Used in small amounts together with free radical initiator to effect vinyl polymerization giving carbon chains. --. Columns 9 and 10, TABLE 4, fifth column, line 12 thereof, "-46" should read -- -40 --. Column 9, line 73, "mttal wire cake" should read -- metal wire cage --. Columns 11 and 12, TABLE 7, sixth column, line 4 thereof, insert -- 4 --. Column 13, line 26, after "bis-" insert -- $\beta$ --. Column 14, lines 9 to 12, the portion of the formula reading:

$(CH_2-$         should read         $(CH_2=$ line 51, "precipitation" should read -- reprecipitation --. Column 16, line 27, "waetr" should read -- water --. Column 17, line 26, "1 to 23" should read -- 1 to 24 --.

Signed and sealed this 17th day of March 1970.

(SEAL)
Attest:

EDWARD M. FLETCHER, JR.                                  WILLIAM E. SCHUYLER, JR.
Attesting Officer                                                    Commissioner of Patents